US011838396B2

(12) United States Patent
Brissette et al.

(10) Patent No.: US 11,838,396 B2
(45) Date of Patent: *Dec. 5, 2023

(54) ETHERNET VIRTUAL PRIVATE NETWORK USING SEGMENT ROUTING

(71) Applicant: Cisco Technology, Inc., San Jose, CA (US)

(72) Inventors: Patrice Brissette, Gatineau (CA); Clarence Filsfils, Brussels (BE); Darren Dukes, Ottawa (CA); Gaurav Dawra, San Jose, CA (US); Francois Clad, Strasbourg (FR); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,188

(22) Filed: Feb. 14, 2022

(65) Prior Publication Data
US 2022/0166860 A1    May 26, 2022

Related U.S. Application Data

(63) Continuation of application No. 16/697,134, filed on Nov. 26, 2019, now Pat. No. 11,283,906, which is a
(Continued)

(51) Int. Cl.
*H04L 69/22* (2022.01)
*H04L 69/324* (2022.01)
(Continued)

(52) U.S. Cl.
CPC .......... *H04L 69/22* (2013.01); *H04L 12/4633* (2013.01); *H04L 12/4641* (2013.01);
(Continued)

(58) Field of Classification Search
CPC ...................................................... H04L 69/22
See application file for complete search history.

(56) References Cited

U.S. PATENT DOCUMENTS

| 8,059,661 | B2 | 11/2011 | Patel et al. |
| 8,151,088 | B1 | 4/2012 | Bao et al. |
| | | (Continued) | |

OTHER PUBLICATIONS

International Preliminary Report on Patentability for PCT Application No. PCT/US2018/039714 dated Jan. 9, 2020, 16 pages.
(Continued)

*Primary Examiner* — Jason E Mattis
(74) *Attorney, Agent, or Firm* — Polsinelli

(57) ABSTRACT

In one embodiment, Ethernet Virtual Private Network (EVPN) is implemented using Internet Protocol Version 6 (IPv6) Segment Routing (SRv6) underlay network and SRv6-enhanced Border Gateway Protocol (BGP) signaling. A particular route associated with a particular Internet Protocol Version 6 (IPv6) Segment Routing (SRv6) Segment Identifier (SID) is advertised in a particular route advertisement message of a routing protocol (e.g., BGP). The SID includes encoding representing a particular Ethernet Virtual Private Network (EVPN) Layer 2 (L2) flooding Segment Routing end function of the particular router and a particular Ethernet Segment Identifier (ESI), with the particular SID including a routable prefix to the particular router. The particular router receives a particular packet including the particular SID; and in response, the particular router performs the particular EVPN end function on the particular packet.

20 Claims, 6 Drawing Sheets

Related U.S. Application Data continuation of application No. 15/783,753, filed on Oct. 13, 2017, now Pat. No. 10,491,720.

(60) Provisional application No. 62/525,439, filed on Jun. 27, 2017.

(51) Int. Cl.

| | | |
|---|---|---|
| *H04L 45/00* | (2022.01) | |
| *H04L 67/10* | (2022.01) | |
| *H04L 45/02* | (2022.01) | |
| *H04L 45/50* | (2022.01) | |
| *H04L 61/5007* | (2022.01) | |
| *H04L 67/63* | (2022.01) | |
| *H04L 12/46* | (2006.01) | |
| *H04L 45/74* | (2022.01) | |
| *H04L 49/35* | (2022.01) | |
| *H04L 45/741* | (2022.01) | |
| *H04L 61/2503* | (2022.01) | |
| *H04L 101/659* | (2022.01) | |
| *H04L 101/00* | (2022.01) | |
| *H04L 43/028* | (2022.01) | |
| *H04L 9/40* | (2022.01) | |
| *H04L 45/745* | (2022.01) | |

(52) U.S. Cl.
CPC .............. *H04L 45/04* (2013.01); *H04L 45/14* (2013.01); *H04L 45/34* (2013.01); *H04L 45/50* (2013.01); *H04L 45/74* (2013.01); *H04L 45/741* (2013.01); *H04L 49/35* (2013.01); *H04L 61/5007* (2022.05); *H04L 67/10* (2013.01); *H04L 67/63* (2022.05); *H04L 69/324* (2013.01); *H04L 43/028* (2013.01); *H04L 45/745* (2013.01); *H04L 61/2503* (2013.01); *H04L 63/0272* (2013.01); *H04L 2101/00* (2022.05); *H04L 2101/659* (2022.05); *H04L 2212/00* (2013.01)

(56) References Cited

U.S. PATENT DOCUMENTS

| | | |
|---|---|---|
| 8,520,672 B2 | 8/2013 | Guichard et al. |
| 9,019,814 B1 | 4/2015 | Mohanty et al. |
| 9,112,723 B2 | 8/2015 | Alexander, Jr. et al. |
| 9,148,290 B2 | 9/2015 | Salam et al. |
| 9,178,816 B1 | 11/2015 | Ojha et al. |
| 9,258,765 B1 | 2/2016 | Dacosta |
| 9,397,931 B1 | 7/2016 | Mohanty et al. |
| 9,537,769 B2 | 1/2017 | Bryant et al. |
| 9,660,897 B1 | 5/2017 | Gredler |
| 9,742,678 B2 | 8/2017 | Boutros et al. |
| 9,762,488 B2 | 9/2017 | Previdi et al. |
| 10,063,475 B2 | 8/2018 | Previdi et al. |
| 10,382,334 B2 | 8/2019 | Previdi et al. |
| 10,469,361 B1 * | 11/2019 | Bayross .................. H04L 45/18 |
| 10,491,720 B2 * | 11/2019 | Brissette ............... H04L 45/507 |
| 10,506,083 B2 | 12/2019 | Filsfils et al. |
| 10,516,610 B2 | 12/2019 | Filsfils et al. |
| 10,530,873 B1 | 1/2020 | Arya |
| 10,652,366 B2 | 5/2020 | Bashandy et al. |
| 10,778,816 B2 | 9/2020 | Filsfils et al. |
| 11,283,906 B2 * | 3/2022 | Brissette .................. H04L 45/34 |
| 2004/0111494 A1 | 6/2004 | Kostic et al. |
| 2004/0223497 A1 | 11/2004 | Sanderson et al. |
| 2011/0075667 A1 | 3/2011 | Li et al. |
| 2011/0110375 A1 | 5/2011 | Boucadair et al. |
| 2011/0286452 A1 | 11/2011 | Balus et al. |
| 2013/0227284 A1 | 8/2013 | Pfeffer et al. |
| 2014/0032782 A1 | 1/2014 | Jiang et al. |
| 2014/0098671 A1 | 4/2014 | Raleigh et al. |
| 2014/0098675 A1 | 4/2014 | Frost et al. |
| 2014/0269422 A1 | 9/2014 | Filsfils et al. |
| 2014/0269721 A1 | 9/2014 | Bashandy et al. |
| 2014/0369356 A1 | 12/2014 | Bryant et al. |
| 2015/0109902 A1 | 4/2015 | Kumar et al. |
| 2015/0256456 A1 | 9/2015 | Previdi et al. |
| 2015/0304206 A1 | 10/2015 | Filsfils et al. |
| 2015/0326675 A1 | 11/2015 | Kini et al. |
| 2016/0014071 A1 | 1/2016 | Asati et al. |
| 2016/0021400 A1 | 1/2016 | Surcouf et al. |
| 2016/0099864 A1 | 4/2016 | Akiya et al. |
| 2016/0173366 A1 | 6/2016 | Saad et al. |
| 2016/0248860 A1 | 8/2016 | Dunbar et al. |
| 2016/0285780 A1 | 9/2016 | Strijkers et al. |
| 2016/0294644 A1 | 10/2016 | Pacella et al. |
| 2016/0359672 A1 | 12/2016 | Blair et al. |
| 2016/0380848 A1 | 12/2016 | Raney |
| 2017/0005922 A1 | 1/2017 | Tantsura et al. |
| 2017/0012873 A1 | 1/2017 | Berg |
| 2017/0012895 A1 | 1/2017 | Zhao et al. |
| 2017/0026286 A1 | 1/2017 | Surcouf et al. |
| 2017/0033939 A1 | 2/2017 | Bragg |
| 2017/0063600 A1 | 3/2017 | Singh |
| 2017/0134274 A1 | 5/2017 | Ara Jo |
| 2017/0141963 A1 | 5/2017 | Chalapathy et al. |
| 2017/0237656 A1 | 8/2017 | Gage |
| 2017/0250908 A1 | 8/2017 | Nainar et al. |
| 2017/0310594 A1 | 10/2017 | Kotha et al. |
| 2017/0339052 A1 | 11/2017 | Arora et al. |
| 2017/0346707 A1 | 11/2017 | Menon et al. |
| 2017/0346720 A1 | 11/2017 | Lazzeri et al. |
| 2018/0006948 A1 | 1/2018 | Torvi et al. |
| 2018/0006995 A1 | 1/2018 | Bickhart et al. |
| 2018/0034727 A1 | 2/2018 | Nainar et al. |
| 2018/0102965 A1 | 4/2018 | Hari et al. |
| 2018/0109444 A1 | 4/2018 | Sajassi |
| 2018/0219783 A1 | 8/2018 | Pfister et al. |
| 2018/0241718 A1 | 8/2018 | Stair et al. |
| 2018/0295156 A1 | 10/2018 | Kolbe et al. |
| 2018/0357576 A1 | 12/2018 | Filsfils et al. |
| 2018/0359176 A1 | 12/2018 | Nainar |
| 2018/0373768 A1 | 12/2018 | Previdi et al. |
| 2018/0375764 A1 | 12/2018 | Filsfils et al. |
| 2018/0375766 A1 | 12/2018 | Filsfils et al. |
| 2018/0375768 A1 | 12/2018 | Previdi et al. |
| 2018/0375968 A1 | 12/2018 | Bashandy et al. |
| 2019/0215267 A1 | 7/2019 | Filsfils et al. |
| 2019/0288940 A1 | 9/2019 | Filsfils et al. |
| 2019/0394211 A1 | 12/2019 | Filsfils et al. |

OTHER PUBLICATIONS

International Search Report and Written Opinion of PCT Application No. PCT/US2018/039714 dated Sep. 12, 2018, 19 pages.

Communication from the European Patent Office for Application EP18742689.5 dated Feb. 2, 2021, 11 pages.

S. Deering and R. Hinden; "Internet Protocol, Version 6 (IPv6) Specification"; RFC 2460; Dec. 1998; The Internet Society; Reston, VA; 39 pages.

S. Deering and R. Hinden; "Internet Protocol, Version 6 (IPv6) Specification"; RFC 8200; Jul. 2017; The Internet Society; Reston, VA; 42 pages.

Y. Rekhter, Ed. et al.; "A Border Gateway Protocol 4 (BGP-4)"; RFC 4271; Jan. 2006; The Internet Society; Reston, VA; 104 pages.

S.Sangli et al.; "BGP Extended Communities Attribute"; RFC 4360; Feb. 2006; The Internet Society; Reston, VA; 12 pages.

T. Bates et al.; "Multiprotocol Extensions for BGP-4"; RFC 4760; Jan. 2007; The Internet Society; Reston, VA; 12 pages.

P. Mohapatra and E. Rosen; "The BGP Encapsulation Subsequent Address Family Identifier (SAFI) and the BGP Tunnel Encapsulation Attribute"; RFC 5512; Apr. 2009; The Internet Society; Reston, VA; 13 pages.

E. Rosen and Y. Rekhter; "IANA Registries for BGP Extended Communities"; RFC 7153; Mar. 2014; The Internet Society; Reston, VA; 16 pages.

Filsfils et al., "Segment Routing Architecture"; draft-ietf-spring-segment-routing-12; Jun. 20, 2017; The Internet Society, Reston, VA, USA; 28 pages.

(56) References Cited

OTHER PUBLICATIONS

S. Previdei, Ed. et al.; "IPv6 Segment Routing Header (SRH)"; draft-ietf-6man-segment-routing-header-07; Jul. 20, 2017; The Internet Society, Reston, VA, USA; 34 pages.
Filsfils et al.; "Segment Routing Policy for Traffic Engineering"; draft-filsfils-spring-srv6-network-programming-01; Jun. 28, 2017; The Internet Society, Reston, VA, USA; 42 pages.
Filsfils et al.; "SRv6 Network Programming"; draft-filsfils-spring-segment-routing-policy-01.txt; Jul. 3, 2017; The Internet Society, Reston, VA, USA; 30 pages.
Dawra et al.; "BGP Signaling of IPv6-Segment-Routing-based VPN Networks;" draft-dawra-idr-srv6-vpn-01.txt; Sep. 11, 2017; The Internet Society, Reston, VA, USA; 12 pages.
E. Rosen and Y. Rekhter; "BGP/MPLS IP Virtual Private Networks (VPNs)"; RFC 4364; Feb. 2006; The Internet Society; Reston, VA; 47 pages.
K. Kompella, Ed. and Y. Rekhter, Ed.; "Virtual Private LAN Service (VPLS) Using BGP for Auto-Discovery and Signaling"; RFC 4761; Jan. 2007; The Internet Society; Reston, VA; 28 pages.
M. Lasserre, Ed. and V. Kompella, Ed.; "Virtual Private LAN Service (VPLS) Using Label Distribution Protocol (LDP) Signaling"; RFC 4762; Jan. 2007; The Internet Society; Reston, VA; 31 pages.
R. Aggarwal et al.; "BGP Encodings and Procedures for Multicast in MPLS/BGP IP VPNs"; RFC 6514; Feb. 2012; The Internet Society; Reston, VA; 59 pages.
A. Sajassi Ed., et al.; "Requirements for Ethernet VPN (EVPN)"; RFC 7209; May 2014; The Internet Society; Reston, VA; 15 pages.
A. Sajassi Ed., et al.; "BGP MPLS-Based Ethernet VPN"; RFC 7432; Feb. 2015; The Internet Society; Reston, VA; 15 pages.
A. Sajassi Ed., et al.; "Provider Backbone Bridging Combinedwith Ethernet VPN (PBB-EVPN)"; RFC 7623; Sep. 2015; The Internet Society; Reston, VA; 23 pages.
S. Boutros, et al.; "Virtual Private Wire Service Support in Ethernet VPN"; RFC 8214; Aug. 2017; The Internet Society; Reston, VA; 17 pages.
A. Sajassi, Ed., et al.; "A Network Virtualization Overlay Solution using EVPN"; draft-ietf-bess-evpn-overlay-08; Mar. 27, 2017; The Internet Society; Reston, VA; 29 pages.
J. Rabadan, Ed., et al.; "IP Prefix Advertisement in EVPN"; draft-ietf-bess-evpn-prefix-advertisement-05; Jul. , 182017; The Internet Society; Reston, VA; 33 pages.
S. Boutros et al.; "VXLAN DCI Using EVPN"; draft-boutros-bess-vxlan-evpn-02.txt; Oct. 21, 2016; The Internet Society; Reston, VA; 15 pages.
E. Rosen, Ed., et al.; "The BGP Tunnel Encapsulation Attribute"; draft-ietf-idr-tunnel-encaps-07; Jul. 17, 2017; The Internet Society; Reston, VA; 41 pages.
Dawra et al.; "BGP Signaling of IPv6-Segment-Routing-based VPN Networks;" draft-dawra-idr-srv6-vpn-00.txt; Mar. 13, 2017; The Internet Society, Reston, VA, USA; 12 pages.
Filsfils, et al.; "SRv6 Network Programming"; draft-filsfils-spring-srv6-network-programming-00; Mar. 9, 2017; The Internet Society, Reston, VA, USA; 41 pages.
Filsfils, et al.; "SRv6 Network Programming"; draft-filsfils-spring-srv6-network-programming-04; Mar. 4, 2018; The Internet Society, Reston, VA, USA; 57 pages.
Dawra et al.; "BGP Signaling of IPv6-Segment-Routing-based VPN Networks;" draft-dawra-idr-srv6-vpn-04; Jun. 25, 2018; The Internet Society, Reston, VA, USA; 21 pages.
PCT International Search Report and Written Opinion, PCT Application PCT/US2018/039722, ISA/EP, European Patent Office, Netherlands, dated Sep. 12, 2018, 17 pages.
Previdi, et al., "IPv6 Segment Routing Header (SRH)," draft-ieff-6man-segment-routing-header-06, Mar. 13, 2017, The Internet Society, Reston, VA, USA, 35 pages.
Abdelsalam, et al., "Implementation of Virtual Network Function Chaining through Segment Routing in a Linuxbased NFV Infrastructure," arXiv.org, Apr. 20, 2017, XP055505386, DOI: arXiv:1702.05157v4, Cornell University Library, Ithaca, NY, 10 pages.

Filsfils, et al., "Segment Routing Architecture," draft-ietf-spring-segment-routing-15, Jan. 25, 2018, The Internet Society, Reston, VA, USA, 31 pages.
Previdi, et al., "IPv6 Segment Routing Header (SRH)," draft-ietf-6man-segment-routing-header-10, Mar. 17, 2018, The Internet Society, Reston, VA, USA, 33 pages.
Bates, et al., "Multiprotocol Extensions for BGP-4," RFC 2283, Feb. 1998, The Internet Society, Reston, VA, USA, 9 pages.
Rosen, et al., "Multiprotocol Label Switching Architecture," RFC 3031, Jan. 2001, The Internet Society, Reston, VA, USA, 61 pages.
"Information Technology—Telecommunications and information exchange between systems—Intermediate System to Intermediate System intra-domain routing information exchange protocol for use in conjunction with the protocol for providing the connectionless-mode network service (ISO 8473)," Second Edition, Nov. 15, 2002, Switzerland, 210 pages.
Amendment A, U.S. Appl. No. 15/824,455, United States Patent and Trademark Office, Alexandria, VA, dated Sep. 27, 2019, 14 Pages.
Boutros S., et al., "Virtual Private Wire Service Support in Ethernet VPN (RFC8214)," IP.Com, Internet Engineering Task Force IETF, Aug. 2017, 18 Pages.
Communication Pursuant to Article 94(3) EPC (EPO Office action) for EP Application No. 18742689.5, dated Feb. 2, 2021, 11 Pages.
Communication Pursuant to Rules 161(2) and 162 EPC (EPO Office action) for EP Application No. 18742689.5, dated Feb. 4, 2020, 3 Pages.
Dawra G., et al., "BGP Signaling of IPv6-Segment-Routing-based VPN Networks; draft-dawra-idr-srv6-vpn-04.txt," Internet-Draft: Inter-Domain Routin, Internet Engineering Task Force, IETF; Standard Working Draft, Internet Society (ISOC) 4, Rue Des Falaises CH-1205 Geneva, Jun. 27, 2018, No. 4, 12 Pages, XP015127105.
Filsfils C., et al., "Segment Routing Architecture draft-ietf-spring-segment-routing-11," Network Working Group, The Internet Society, Internet- Draft, Reston, VA, USA, Feb. 16, 2017, pp. 1-28.
Filsfils D., et al., Inter-Domain Routing Internet-Draft, "BGP Signaling of IPv6-Segment-Routing-Based VPN Networks Draft-Dawra-idr-srv6-vpn-00.txt," Mar. 13, 2017, Retrieved from URL: https://tools.ietf.org/pdf/draft-dawra-idr-srv6-vpn-00.pdf, [Retrieved on Aug. 31, 2018], XP055503683.
Filsfls C., et al., "SRv6 Network Programming; draft-filsfils-spring-srv6-network-programming-00," The Internet Society, Mar. 9, 2017, Reston, VA, USA, 41 Pages.
Halpern J., et al., "Service Function Chaining (SFC) Architecture," RFC 7665, The Internet Society, Reston, VA, USA, Oct. 2015, 32 Pages.
International Preliminary Report on Patentability for International Application No. PCT/US2018/039722, dated Jan. 9, 2020, 12 Pages.
International Preliminary Report on Patentability for International Application No. PCT/US2018/039731, dated Jan. 9, 2020, 16 Pages.
International Preliminary Report on Patentability for International Application No. PCT/US2018/039739, dated Jan. 9, 2020, 13 Pages.
International Search Report and Written Opinion for Application No. PCT/US2018/039731, dated Nov. 13, 2018, 20 Pages.
International Search Report and Written Opinion for International Application No. PCT/US2018/039731, dated Nov. 13, 2018, 20 Pages.
International Search Report and Written Opinion for International Application No. PCT/US2018/039739, dated Sep. 18, 2018, 14 Pages.
Kent S., et al., "Security Architecture for the Internet Protocol," RFC 4301, The Internet Society, Reston, VA, USA, Dec. 2005, 101 Pages.
Kent S., "IP Authentication Header," RFC 4302, The Internet Society, Reston, VA, USA, Dec. 2005, 34 Pages.
Kent S., "IP Encapsulating Security Payload (ESP)," RFC 4303, The Internet Society, Reston, VA, USA, Dec. 2005, 44 Pages.
Krawczyk H., et al., "HMAC: Keyed-Hashing for Message Authentication," RFC 2104, The Internet Society, Reston, VA, USA, Feb. 1997, 11 Pages.

(56) References Cited

OTHER PUBLICATIONS

Lebrun D., "Leveraging IPv6 Segment Routing for Service Function Chaining," Proceedings of ACM CoNEXT 2015 Student Workshop, Heidelberg, Germany, Dec. 2015, 2 Pages.
Office Action, U.S. Appl. No. 15/824,455, United States Patent and Trademark Office, Alexandria, VA, dated Dec. 18, 2019, 17 Pages.
Office Action, U.S. Appl. No. 15/824,455, United States Patent and Trademark Office, Alexandria, VA, dated Mar. 27, 2019, 20 Pages.
Office Action, U.S. Appl. No. 16/006,897, United States Patent and Trademark Office, Alexandria, VA, dated Jun. 26, 2019, 29 Pages.
PCT Invitation to Pay Additional Fees, PCT Application PCT/US2018/039731, ISA/EP, European Patent Office, Netherlands, dated Sep. 20, 2018, 18 Pages.
Previdi S., et al., "IPv6 Segment Routing Header (SRH): draft-ietf-6man-segment-routing-header-13," The Internet Society, Reston, VA, USA, May 23, 2018, 21 Pages.
Quinn P., et al., "Network Service Header (NSH) draft-ietf-sfc-nsh-20," Service Function Chaining, Standards Track, The Internet Society, Reston, VA, USA, Sep. 1, 2017, 34 Pages.
Response to Communication Pursuant to Rule 161 filed in EP Application No. 18742689.5, dated Apr. 15, 2020, Mathys & Squire LLP, London, England, 32 Pages.
Seneviratfine T., et al., "MPLS Label Stack Authentication Methods and Algorithms: draft-tsenevir-mpls-lauth-01.txt," The Internet Society, Reston, VA, USA, Jul. 2001, 7 Pages.

\* cited by examiner

US 11,838,396 B2

ETHERNET VIRTUAL PRIVATE NETWORK USING SEGMENT ROUTING

CROSS-REFERENCE TO RELATED APPLICATIONS

This application is a continuation of U.S. patent application Ser. No. 16/697,134, filed Nov. 26, 2019, which in turn, is a continuation of U.S. patent application Ser. No. 15/783,753, filed Oct. 13, 2017, now U.S. Pat. No. 10,491,720, which claims the benefit of priority to U.S. Provisional Application No. 62/525,439, filed Jun. 27, 2017, all of which are hereby incorporated by reference in their entirety.

TECHNICAL FIELD

The present disclosure relates generally to sending of packets through a packet network, such as, but not limited to, according to Segment Routing of packets through a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network forwarded based on one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
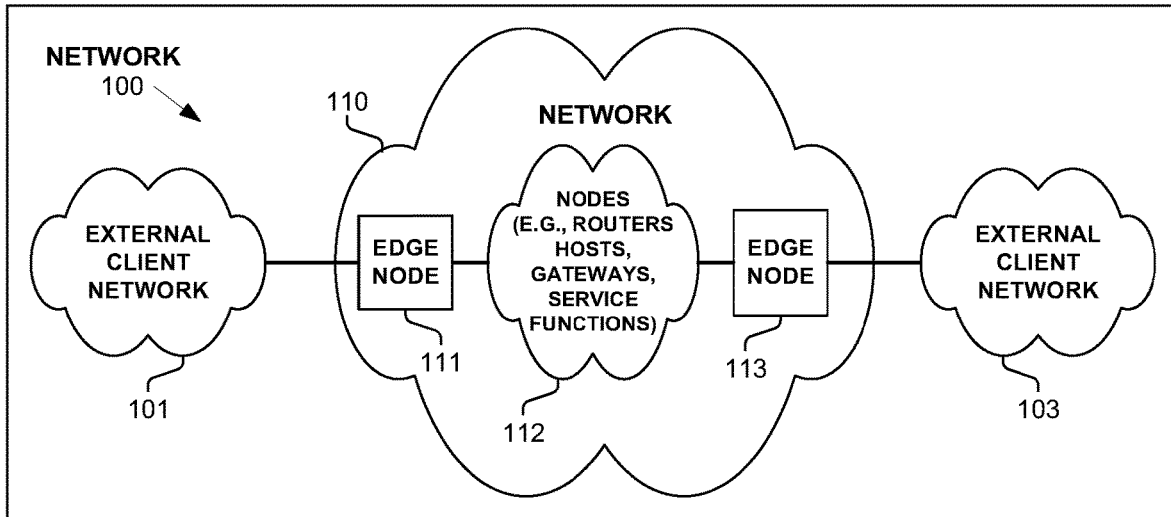
FIG. 1A illustrates a network operating according to one embodiment.

Disclosed are, inter alia, methods, apparatus, computer-storage media, mechanisms, and means associated with Ethernet Virtual Private Network (EVPN) using Internet Protocol Version 6 (IPv6) Segment Routing (SRv6) underlay network and SRv6-enhanced Border Gateway Protocol (BGP) signaling.

One embodiment includes: advertising, in a network via a particular route advertisement message of a routing protocol, a particular route associated with a particular Internet Protocol Version 6 (IPv6) Segment Routing (SRv6) Segment Identifier (SID), with the SID including a locator of a particular router and a function encoding representing a particular Ethernet Virtual Private Network (EVPN) end function of the particular router, with the particular SID including a routable prefix to the particular router; receiving, by the particular router, a particular packet including the particular SID; and in response to said received particular packet including the particular SID, the particular router performing the particular EVPN end function on the particular packet.

One embodiment includes: receiving an advertisement of the particular route being associated with the particular SID by an ingress router in the network; receiving an Ethernet frame by the ingress router; encapsulating the Ethernet frame into the particular packet by the ingress router; and sending the particular packet into the network by the ingress router; wherein said performing the particular EVPN end function on the particular packet includes decapsulating the Ethernet frame from the packet and sending the Ethernet frame from the particular router.

In one embodiment, the particular packet includes a Segment Routing Header (SRH) including the particular SID as the currently active SID. In one embodiment, the routing protocol is Border Gateway Protocol, and the particular route advertising message advertises a BGP route type 1, 2, 3, or 5, and associated with a particular SRv6-VPN Type Length Value (TLV) including the particular SID. In one embodiment, the particular route advertising message includes advertising the particular route being associated with one or more BGP Multiprotocol Label Switching-based (MPLS-based) EVPN labels for which to use in an MPLS packet to invoke corresponding BGP MPLS-based EVPN functionality on a corresponding MPLS packet by the particular router.

One embodiment includes receiving, by an ingress router, an advertisement of the particular route being associated with both the particular SID and said one or more MPLS-EVPN labels; receiving an Ethernet frame by the ingress router; encapsulating the Ethernet frame into the particular packet by the ingress router; and sending the particular packet into the network by the ingress router. In one embodiment, performing the particular EVPN end function on the particular packet includes decapsulating the Ethernet frame from the packet and sending the Ethernet frame from the particular router.

One embodiment includes: receiving, by a second ingress router, an advertisement of the particular route being associated with both the particular SID and said one or more MPLS-EVPN labels; receiving a second Ethernet frame by the second ingress router; encapsulating the second Ethernet frame into a particular MPLS packet by the second ingress router; sending the particular MPLS packet into the network by the second ingress router; and performing said corresponding BGP MPLS-based EVPN functionality on the particular MPLS packet which includes decapsulating the second Ethernet frame from the particular MPLS packet and sending the second Ethernet frame from the particular router.

2. Description

Disclosed are, inter alia, methods, apparatus, computer-storage media, mechanisms, and means associated with EVPN using a SRv6 Underlay Network and SRv6-enhanced Border Gateway Protocol (BGP) signaling. As used herein Segment Routing refers to SRv6. Also, a segment identifier (SID) related to SRv6 typically refers to an IPv6 address, however, it also includes other SRv6 encoding(s) (e.g., compact encoding of SIDs) if so used in the embodiment.

As used herein, a node is a device in a network; a router (also referred to herein as a packet switching device) is a node that forwards received packets not explicitly addressed to itself (e.g., an L2 or L3 packet switching device); and a host is any node that is not a router.

The term "route" is used to refer to a fully or partially expanded prefix (e.g., 10.0.0.1, 10.0.*.*, BGP Network Layer Reachability Information (NLRI), EVPN NLRI), which is different than a "path" through the network which refers to a nexthop (e.g., next router) or complete path (e.g., traverse router A then router B, and so on). Also, the use of the term "prefix" without a qualifier herein refers to a fully or partially expanded prefix.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Disclosed are, inter alia, methods, apparatus, computer-storage media, mechanisms, and means associated with Ethernet Virtual Private Network (EVPN) using Internet Protocol Version 6 (IPv6) Segment Routing (SRv6) underlay network and SRv6-enhanced Border Gateway Protocol (BGP) signaling.

In one embodiment, to support SRv6 based EVPN overlays, a SID is advertised in route-type 1, 2, 3 and 5. The SID (or SIDS), per route-type, are advertised in a new SRv6-VPN SID TLV which is optional transitive BGP Prefix SID attribute. This attribute serves two purposes; first it indicates that the BGP egress device is reachable via an SRv6 underlay and the BGP ingress device receiving this route MAY choose to encapsulate or insert an SRv6 SRH. Second, it indicates the value of the SID or SIDs to include in the SRH encapsulation. A BGP speaker supporting an SRv6 underlay MAY distribute SIDs per route via the BGP SRv6 Attribute. If the BGP speaker supports MPLS based EVPN simultaneously, then it MAY also populate the Label values in EVPN route types and allow the BGP ingress device to decide which encapsulation to use. If the BGP speaker does not support MPLS based EVPN services the MPLS Labels in EVPN route types MUST be set to IMPLICIT-NULL.

One embodiment includes: advertising, in a network via a particular route advertisement message of a routing protocol, a particular route associated with a particular Internet Protocol Version 6 (IPv6) Segment Routing (SRv6) Segment Identifier (SID), with the SID including a locator of a particular router and a function encoding representing a particular Ethernet Virtual Private Network (EVPN) end function of the particular router, with the particular SID including a routable prefix to the particular router; receiving, by the particular router, a particular packet including the particular SID; and in response to said received particular packet including the particular SID, the particular router performing the particular EVPN end function on the particular packet.

One embodiment includes: receiving an advertisement of the particular route being associated with the particular SID by an ingress router in the network; receiving an Ethernet frame by the ingress router; encapsulating the Ethernet frame into the particular packet by the ingress router; and sending the particular packet into the network by the ingress router; wherein said performing the particular EVPN end function on the particular packet includes decapsulating the Ethernet frame from the packet and sending the Ethernet frame from the particular router.

In one embodiment, the particular packet includes a Segment Routing Header (SRH) including the particular SID as the currently active SID. In one embodiment, the routing protocol is Border Gateway Protocol, and the particular route advertising message advertises a BGP route type 1, 2, 3, or 5, and associated with a particular SRv6-VPN Type Length Value (TLV) including the particular SID. In one embodiment, the particular route advertising message includes advertising the particular route being associated with one or more BGP Multiprotocol Label Switching-based (MPLS-based) EVPN labels for which to use in an MPLS packet to invoke corresponding BGP MPLS-based EVPN functionality on a corresponding MPLS packet by the particular router.

One embodiment includes receiving, by an ingress router, an advertisement of the particular route being associated with both the particular SID and said one or more MPLS-EVPN labels; receiving an Ethernet frame by the ingress router; encapsulating the Ethernet frame into the particular packet by the ingress router; and sending the particular packet into the network by the ingress router. In one embodiment, performing the particular EVPN end function on the particular packet includes decapsulating the Ethernet frame from the packet and sending the Ethernet frame from the particular router.

One embodiment includes: receiving, by a second ingress router, an advertisement of the particular route being associated with both the particular SID and said one or more MPLS-EVPN labels; receiving a second Ethernet frame by the second ingress router; encapsulating the second Ethernet frame into a particular MPLS packet by the second ingress router; sending the particular MPLS packet into the network by the second ingress router; and performing said corresponding BGP MPLS-based EVPN functionality on the particular MPLS packet which includes decapsulating the second Ethernet frame from the particular MPLS packet and sending the second Ethernet frame from the particular router.

Disclosed are, inter alia, methods, apparatus, computer-storage media, mechanisms, and means associated with EVPN using a SRv6 Underlay Network and SRv6-enhanced Border Gateway Protocol (BGP) signaling.

FIG. 1A illustrates network 100 operating according to one embodiment. As shown, network 100 includes client networks 101 and 103 (which are the same network in one embodiment) external to network 110, which includes edge nodes (e.g., SRv6 and/or MPLS) 111 and 113 and a network 112 of nodes (e.g., routers, hosts, gateways, and service functions) some, none, or all of which may be SR-capable nodes. In response to receiving a native packet, a SR edge node 111, 113 identifies a SR policy (e.g., list of one or more segments) through or to which to forward a SR packet encapsulating the native packet. These policies can change in response to network conditions, network programming, route advertisements, etc. SR edge nodes 111 and 113 also decapsulate native packets from SR packets and forward the native packets into network 101 and 103.

Figure 1B:
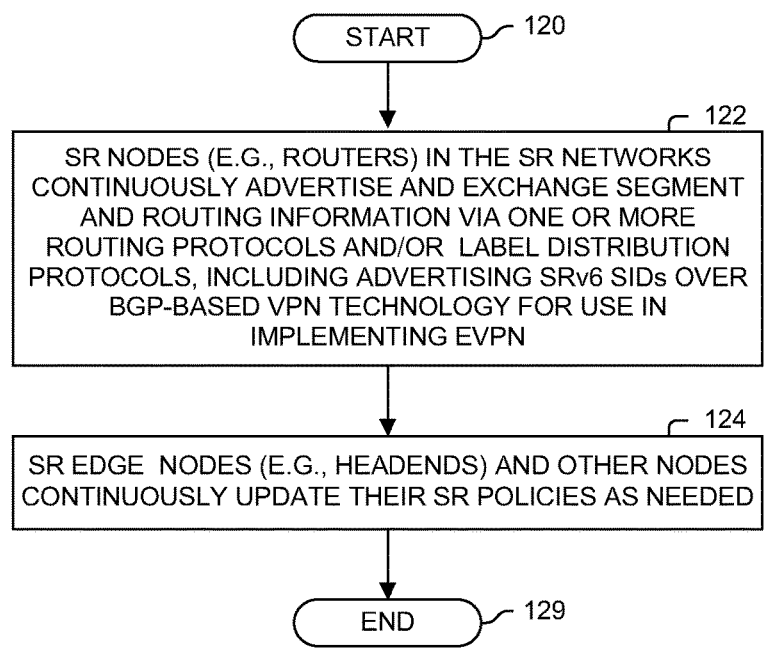
FIG. 1B illustrates a process according to one embodiment.

FIG. 1B illustrates a process according to one embodiment. Processing begins with process block 120. In process block 122, SR nodes (e.g., routers) in the SR networks continuously advertise and exchange segment and routing information via one or more routing protocols and/or via one or more label distribution protocols. In one embodiment, a BGP route advertisement includes SRv6 EVPN information including one or more SIDs. In one embodiment, a BGP route advertisement includes SRv6 EVPN information (e.g., including one or more SIDs) and MPLS EVPN information. In one embodiment, a BGP route advertisement includes SRv6 EVPN information (e.g., including one or more SIDs) and an implicit null in each label field MPLS EVPN information signaling that the advertising node does not support MPLS EVPN but supports SRv6 EVPN. In process block 124, SR edge devices (e.g., SRv6 headends) continuously update their SR policies as needed. Processing of the flow diagram of FIG. 1B is complete as indicated by process block 129.

Figure 1C:
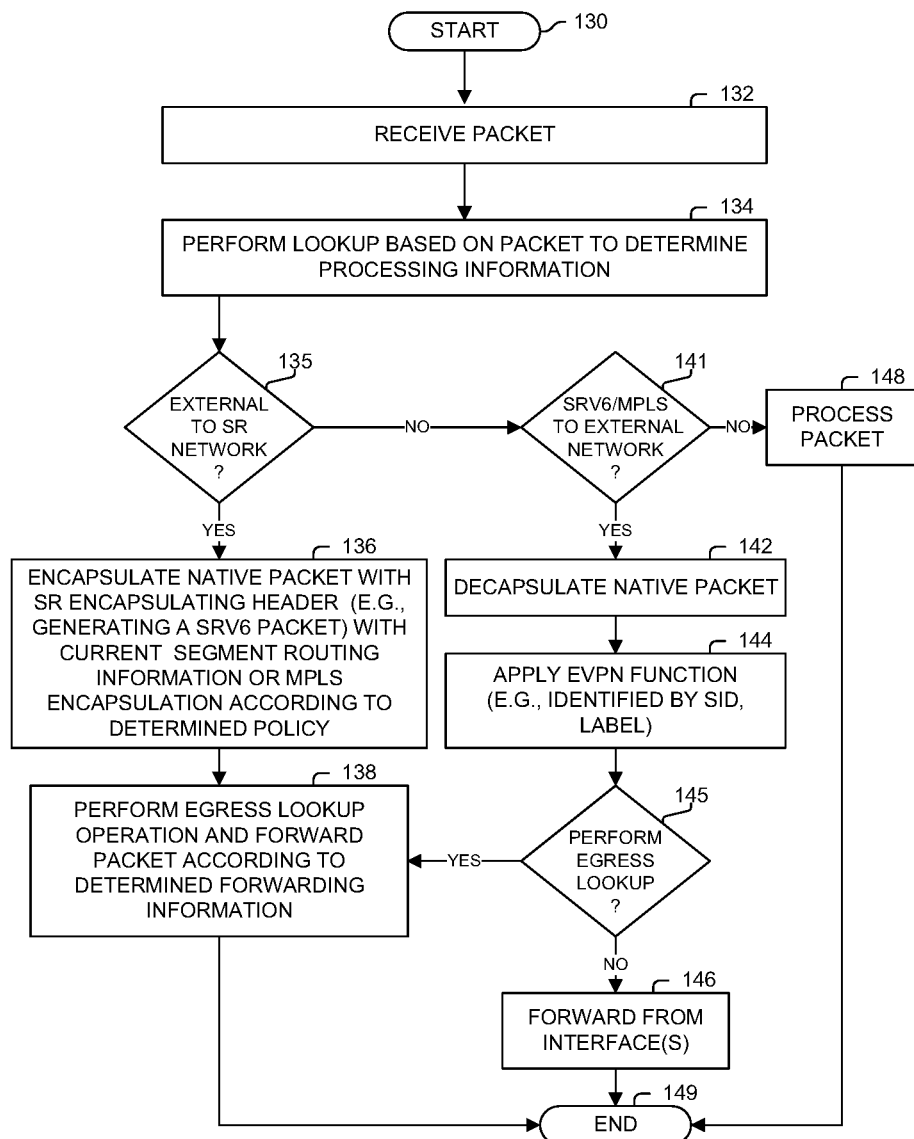
FIG. 1C illustrates a process according to one embodiment.

FIG. 1C illustrates a process performed by a SR edge router according to one embodiment. Processing begins with process block 130. In process block 132, a packet is received. In process block 134, an ingress lookup operation is performed based on the packet to determine processing information. As determined in process block 135, if the packet was received on an external network interface and will be sent into a SRv6 or MPLS network, then processing proceeds to process block 136, else processing proceeds to process block 141. As determined in process block 141, if the packet was received on a SRv6 or MPLS network interface and will be sent to an external network, then processing proceeds to process block 142, else processing proceeds to process block 148 wherein the packet is processed normally and processing proceeds to process block 149.

Continuing in process block 136, the received native packet is encapsulated into a SRv6 packet with a SRv6 encapsulating header with at least one SID identifying an EVPN End Function according to a corresponding policy, and processing proceeds to process block 138.

Continuing in process block 142, the native packet is removed from being encapsulated in the received SRv6 or MPLS packet; in process block 144, the Segment Routing EVPN End Function identified from the SID in the received SRv6 packet is performed or the EVPN function identified by an MPLS label is performed; and processing proceeds to process block 145. As determined in process block 145, if an egress lookup operation is to be performed as part of the EVPN function being applied, then processing proceeds to process block 138. Otherwise, in process block 146, the native packet is forwarded from one or more corresponding interfaces as part of the EVPN function being applied, and processing proceeds to process block 149.

Continuing with process block 138, an egress lookup operation is performed on the outbound packet to determine forwarding information, with the packet being forwarded accordingly. Processing proceeds to process block 149.

Continuing in process block 149, processing of the flow diagram of FIG. 1C is complete as indicated by process block 149.

Figure 1D:
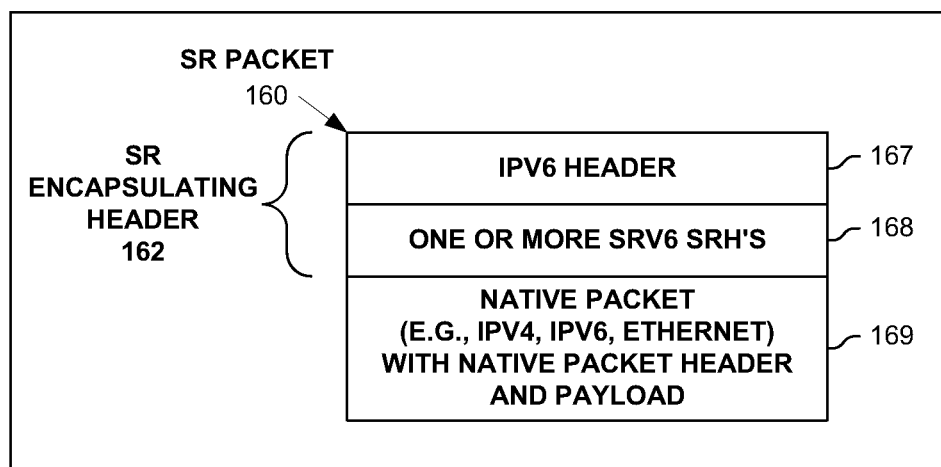
FIG. 1D illustrates different Segment Routing (SR) packet formats according to one embodiment.

FIG. 1D illustrates a Segment Routing (SR) packet 160 according to one embodiment. As shown, SR packet 160 (e.g. SRv6 packet) includes a SR encapsulating header 162 and native packet 169. SR encapsulating header 162 includes an IPv6 header 167 and one or more SR headers (SRHs) 168.

Figure 2A:
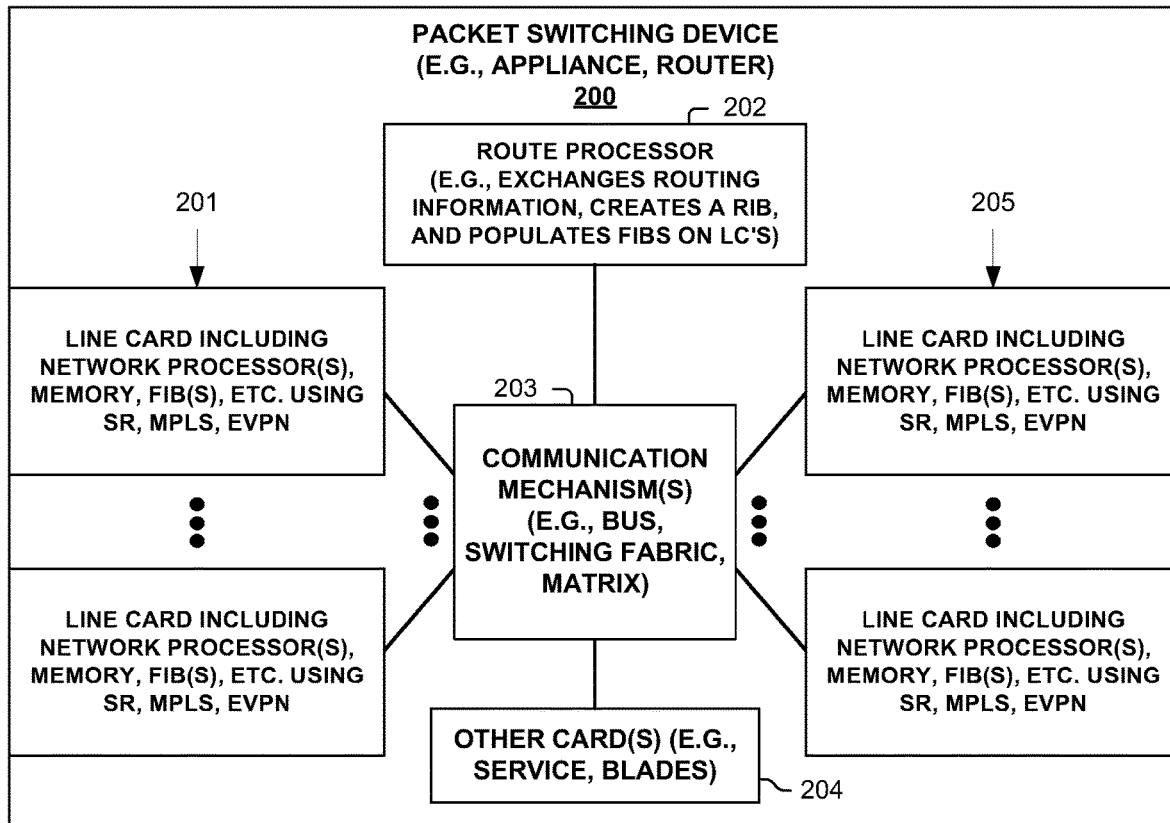
FIG. 2A illustrates a packet switching device according to one embodiment.
Figure 2B:
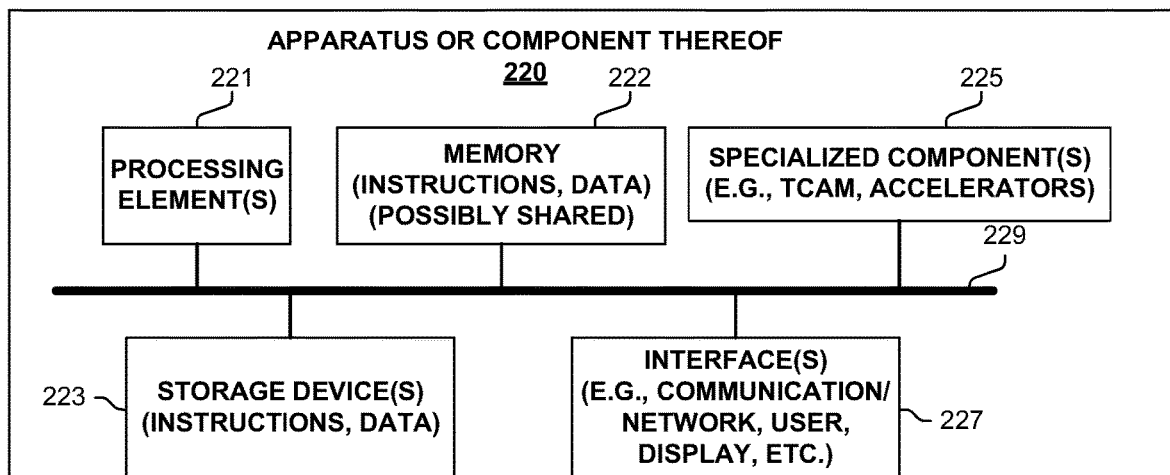
FIG. 2B illustrates an apparatus according to one embodiment.

FIGS. 2A-B and their discussion herein provide a description of various SRv6 and/or MPLS nodes according to one embodiment.

FIG. 2A illustrates one embodiment of a packet switching device 200 (e.g., SR-capable router and/or MPLS-capable router) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with EVPN using a SRv6 Underlay Network and SRv6-enhanced Border Gateway Protocol (BGP) signaling. Packet switching device 200 also has a control plane with one or more processing elements 202 for managing the control plane and/or control plane processing of packets associated with EVPN using a SRv6 Underlay Network and SRv6-enhanced Border Gateway Protocol (BGP) signaling. Packet switching device 200 also includes other cards 204 (e.g., service cards, blades) which include processing elements that are used in one embodiment to process (e.g., forward/send, drop, manipulate, change, modify, receive, create, duplicate, perform SR gateway functionality possibly with shared memory with one or more service functions, apply a service according to one or more service functions) packets associated with EVPN using a SRv6 Underlay Network and SRv6-enhanced Border Gateway Protocol (BGP) signaling, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, SRv6 EVPN processing of packets is implemented by packet switching device 200 (e.g., on one or more of line cards 201, 205, on a service card 204).

FIG. 2B is a block diagram of an apparatus 220 used in one embodiment associated with EVPN using a SRv6 Underlay Network and SRv6-enhanced Border Gateway Protocol (BGP) signaling. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup and/or packet processing operations and/or service function, associative memory, binary and/or ternary content-addressable memory, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

One embodiment provides new extensions to BGP to allow advertising certain attributes and functionalities related to SRv6, and end functions to process SRv6 EVPN packets.

To support various SRv6-based EVPN overlay services, one embodiment advertises SIDs using any BGP route-type. To support various SRv6-based EVPN overlay services, one embodiment advertises SIDs using a BGP route-type 1, 2, 3 and/or 5.

In one embodiment, these SIDs are advertised in a new SRv6-VPN SID TLV, which is optional transitive BGP Prefix SID attribute. This attribute serves multiple purposes. The advertising of the SRv6 SID in the SRv6-VPN SID TLV identifies that the BGP egress router is reachable via a SRv6 underlay network. In one embodiment, the BGP ingress router receiving this BGP route advertisement then encapsulates the received packet into a SRv6 packet or inserts a SRv6 SRH into a received IPv6 packet. The advertising of the SRv6 SID in the SRv6-VPN SID TLV also identifies the value of the SID or SIDs to include in the SRH of the packet. In one embodiment, a BGP speaker supporting a SRv6 underlay network distributes SIDs per route via the BGP SRv6 Attribute.

In one embodiment, a BGP Speaker (e.g., a SRv6 egress router supporting both MPLS-based EVPN and SRv6-based EVPN) populates the MPLS label fields in the EVPN route types of a route advertisement, thus providing a BGP ingress router receiving this route advertisement two different underlay networks (e.g., MPLS and SRv6) to select among to send to the egress SRv6 router (that is both MPLS and SRv6 capable). In one embodiment, a BGP Speaker (e.g., a SRv6 egress router not supporting MPLS-based EVPN but supporting SRv6-based EVPN) populates the MPLS label fields in the EVPN route types of a route advertisement to IMPLICIT-NULL, thus providing a BGP ingress router receiving this route advertisement the SRv6 routing information and informing it that it does not support MPLS-based EVPN. In this manner, ingress and egress routers no longer have to negotiate underlay network capabilities, nor use BGP Capabilities Advertisements to ensure that they both are capable of properly processing such advertised NLRI.

Figure 3A:
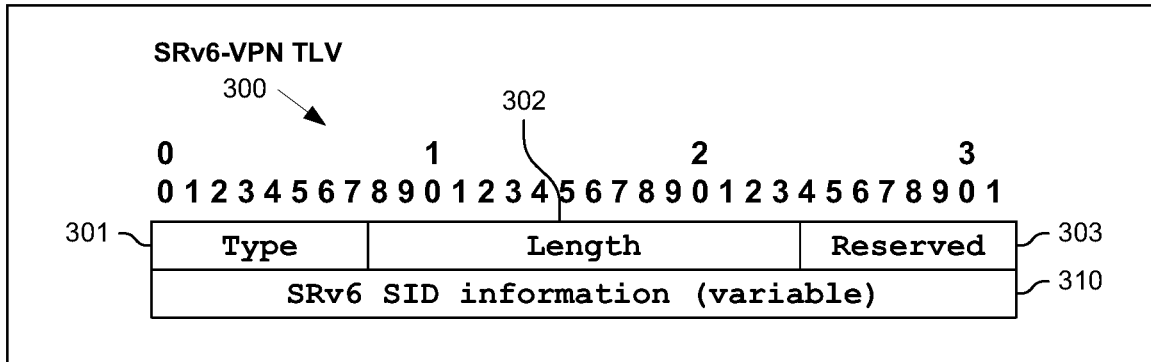
FIG. 3A illustrates a SRv6 Type-Length-Value (TLV) according to one embodiment.

FIG. 3A illustrates a SRv6 Type-Length-Value (TLV) 300 according to one embodiment. As shown, SRv6 TLV 300 includes a Type field 301 (e.g., eight bits), a Length field 302 (e.g., sixteen bits) indicating the length of the value field, a Reserve field 303 (e.g., eight bits), and a value field containing SRv6 SID information 310.

Figure 3B:
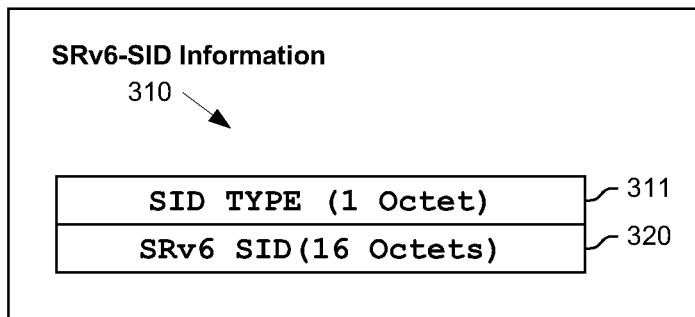
FIG. 3B illustrates SRv6-SID information according to one embodiment.

FIG. 3B illustrates SRv6-SID information 310 according to one embodiment. As shown, SRv6-SID information 310 includes a SID Type Field 311 (e.g., one octet) and a SRv6 SID 320 (e.g., an 128 bit IPv6 routable address). In one embodiment, SID Type Field 311 is set to type-1 for a Layer-3 End Function. In one embodiment, SID Type Field 311 is set to type-2 for a Layer-2 End Function.

Figure 3C:
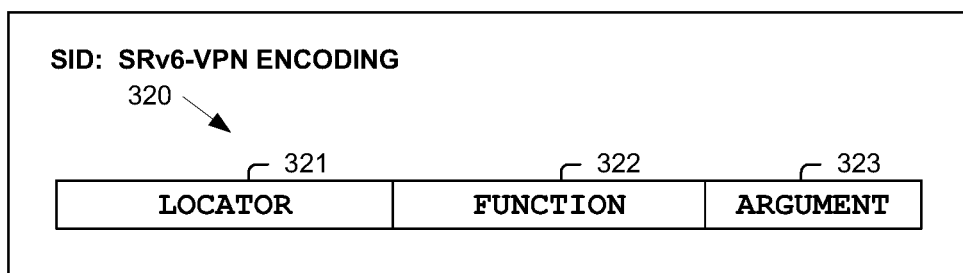
FIG. 3C illustrates SRv6-VPN encoding according to one embodiment.

FIG. 3C illustrates SRv6-VPN encoding of a SRv6 SID 320 according to one embodiment. As shown, SRv6 SID 320 includes a Locator 321 (identifying a router to which the SID corresponds), a Function 322 (e.g., identifies processing to be performed by the router), and an optional Argument 323 for use in performing the processing. In one embodiment, the entire SRv6 320 is used in routing a packet through the network to the BGP egress router. In one embodiment, a non-fully expanded prefix of SID 320 (e.g., locator 321, locator 321 plus function 322) is used in routing a packet through the network to the BGP advertising router.

Figure 4A:
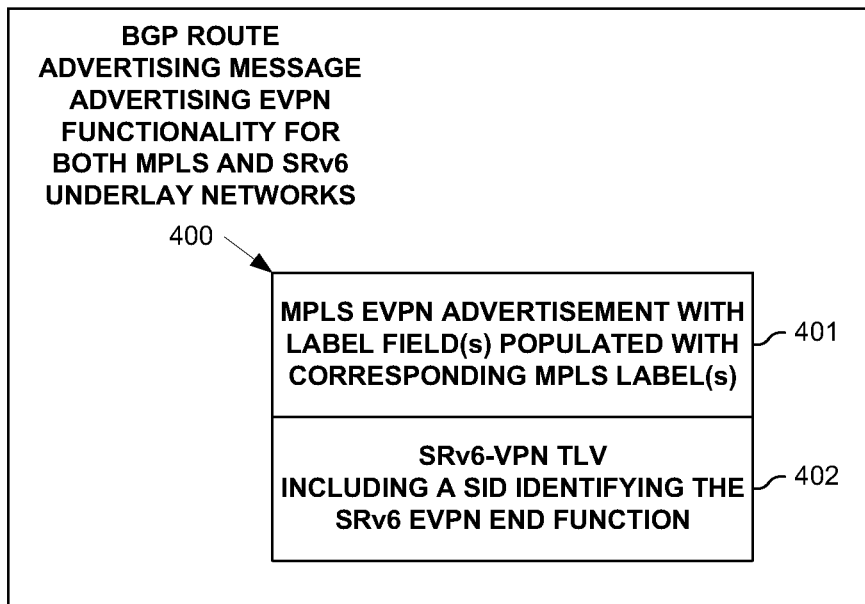
FIG. 4A illustrates a SRv6-enhanced Border Gateway Protocol (BGP) route advertisement message according to one embodiment.

FIG. 4A illustrates a SRv6-enhanced Border Gateway Protocol (BGP) route advertisement message 400 according to one embodiment, advertising a BGP EVPN route for both SRv6 and MPLS underlay networks. As shown, BGP route advertising message 400 includes an MPLS EVPN advertisement 401 including corresponding MPLS label(s), and a SRv6 TLV 402 including a SID identifying the SRv6 End Function.

Figure 4B:
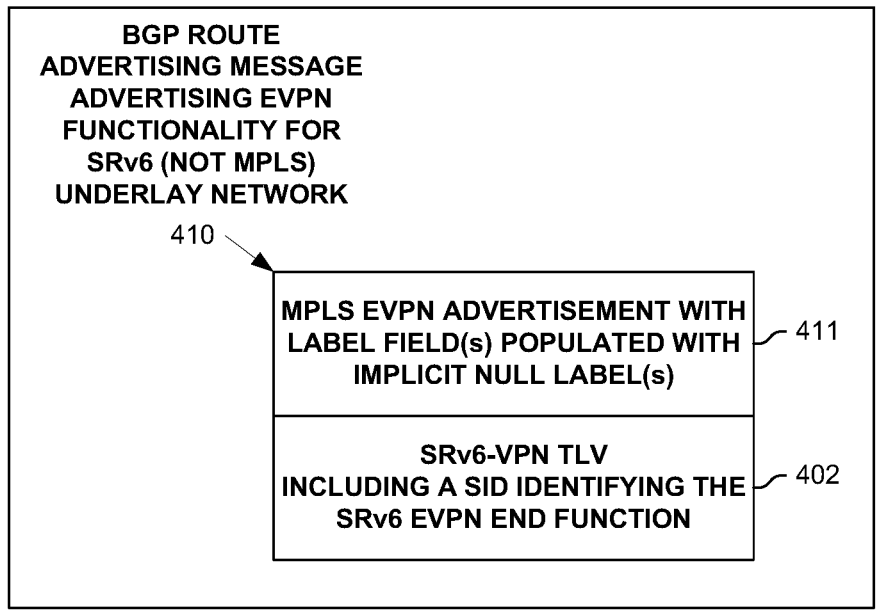
FIG. 4B illustrates a SRv6-enhanced Border Gateway Protocol (BGP) route advertisement message according to one embodiment.

FIG. 4B illustrates a SRv6-enhanced Border Gateway Protocol (BGP) route advertisement message 410 according to one embodiment, advertising a BGP EVPN route for a SRv6 underlay network but not for an MPLS underlay network. As shown, BGP route advertising message 410 includes an MPLS EVPN advertisement 411 including Implicit Null label(s) in MPLS label field(s), and a SRv6 TLV 402 including a SID identifying the SRv6 End Function (e.g., the same SRv6 TLV 402 in both BGP advertising messages 410 (of FIG. 4B) and 400 (of FIG. 4A).

Ethernet Auto-Discovery Route Over SRv6 Core

Ethernet Auto-discovery (A-D) routes are Type-1 route type, defined in RFC 7432, and may be used to achieve split horizon filtering, fast convergence and aliasing. EVPN route type-1 is also used in EVPN-VPWS as well as in EVPN flexible cross-connect; mainly used to advertise point-to-point services id.

Multihomed PEs may advertise an Ethernet auto discovery route per Ethernet segment with the introduced ESI MPLS label extended community, defined in RFC 7432. Provider edge routers (PEs) may identify other PEs connected to the same Ethernet segment after the EVPN type-4 ES route exchange. All the multihomed PE and all remote PEs that are part of same EVI may import the auto discovery route.

In one embodiment, EVPN Route Type-1 is encoded as follows for SRv6 Core:
  Route Distinguisher (RD) (e.g., eight octets),
  Ethernet Segment Identifier (e.g., ten octets),
  Ethernet Tag ID (e.g., eight octets), and
  MPLS label (e.g., three octets).
For a SRv6 only BGP speaker for a SRv6 Core: SRv6-VPN SID TLV may be advertised with the route.
EVPN Route Type-1 (Per-ES AD)
Where:
  BGP next-hop: IPv6 address of an egress PE
  Ethernet Tag ID: all FFFF's
  MPLS Label: always set to zero value
  Extended Community: ESI label extended community In one embodiment, a SRv6-VPN TLV is (or may be) advertised along with the route advertisement and the behavior of the SRv6-VPN SID is entirely up to the originator of the advertisement. In one embodiment, the behavior is Arg.FE2.
EVPN Route Type-1 (Per-EVI AD)
Where:
  BGP next-hop: IPv6 address of an egress PE
  Ethernet Tag ID: non-zero for VLAN aware bridging, EVPN VPWS and FXC
  MPLS Label: Implicit-Null
In one embodiment, a SRv6-VPN TLV is (or may be) be advertised along with the route advertisement and the behavior of the SRv6-VPN SID is entirely up to the originator of the advertisement. In one embodiment, the behavior is End.DX2, End.DXV2 or End.DT2U.
MAC/IP Advertisement Route (Type-2) with SRv6 Core
  EVPN route type-2 is used to advertise MAC or MAC+IP address reachability for unicast traffic through MP-BGP to all other PEs in a given EVPN instance. In one embodiment, a MAC/IP Advertisement route type is encoded as follows for SRv6 Core:
  Route Distinguisher (RD) (e.g., eight octets),
  Ethernet Segment Identifier (e.g., ten octets),
  Ethernet Tag ID (e.g., eight octets),
  MAC Address Length (e.g., one octet),
  MAC Address (e.g., six octets),
  IP Address Length (e.g., one octet),
  IP Address (e.g., zero, four or sixteen octets),
  MPLS Label-1 (e.g., three octets), and
  MPLS label-2 (e.g., zero or three octets).
where:
  BGP next-hop: IPv6 address of an egress PE,
  MPLS Label-1: Implicit-null, and
  MPLS Label-2: Implicit-null.
In one embodiment, the SRv6-VPN SID TLV is (or may be) advertised. The behavior of the SRv6-VPN SID is entirely up to the originator of the advertisement. In one embodiment, the behavior of the SRv6 SID is as follows:
  End.DX2, End.DTU2 (Layer 2 portion of the route), and
  End.DT6/4 or End.DX6/4 (Layer 3 portion of the route).
  Described below are different types of Type-2 advertisements used in one embodiment. The first type is used in Layer-2 Gateway whereas the second type is used in EVPN IRB.
  MAC/IP Advertisement Route (Type-2) with MAC Only:
    BGP next-hop: IPv6 address of egress PE,
    MPLS Label1: Implicit-null,
    MPLS Label2: Implicit-null, and
    SRv6-VPN SID TLV MAY encode End.DX2 or End.DTU2 behavior.
  MAC/IP Advertisement Route (Type-2) with MAC+IP:
    BGP next-hop: IPv6 address of egress PE,
    MPLS Label1: Implicit-Null,
    MPLS Label2: Implicit-Null, and
    SRv6-VPN SID TLV MAY encode Layer2 End.DX2 or End.DTU2 behavior and Layer3 End.DT6/4 or End.DX6/4 behavior.
Inclusive Multicast Ethernet Tag Route with SRv6 Core
  EVPN route Type-3 is used to advertise multicast traffic reachability information through MP-BGP to all other PEs in a given EVPN instance.
  Route Distinguisher (RD) (e.g., eight octets),
  Ethernet Tag ID (e.g., eight octets),
  IP Address Length (e.g., one octet), and
  Originating Router's IP Address (e.g., 4, or 16 octets).

Where:
BGP next-hop: IPv6 address of egress PE, and
PMSI Tunnel Attribute (per RFC 6514).

In one embodiment, a SRv6-VPN TLV is (or may be) advertised along with the route advertisement and the behavior of the SRv6-VPN SID is entirely up to the originator of the advertisement. In one embodiment, the behavior is End.DT2M.

In one embodiment, the PMSI Tunnel Attribute (see, RFC 6514) is (or may) contain MPLS implicit-null label in the case of Tunnel Type set to ingress-replication.
Flag (e.g., 1 octet),
Tunnel Type (e.g., 1 octet),
MPLS label (e.g., three octets), and
Tunnel Identifier (e.g., variable).
Where:
Tunnel Type (e.g., defined per RFC 6514),
MPLS label: Implicit-Null, and
Tunnel Identifier: IP address of egress PE.

In one embodiment, an Arg.FE2 argument SID is (or may) get applied to an End.DT2M function SID to create a single SID on the ingress PE. The result End.DT2M(FE2) SID is used as EVPN Split-horizon mechanism (e.g., as described in RFC 7432).

Ethernet Segment Route with SRv6 Core

In one embodiment, EVPN route type-4 is used to discover PE participating to the same redundancy group. It is also used in Designated Forwarder (DF) election procedure. In one embodiment, an Ethernet Segment route type is encoded as follows for SRv6 Core:
Route Distinguisher (RD) (e.g., eight octets),
Ethernet Tag ID (e.g., eight octets),
IP Address Length (e.g., one octet), and
Originating Router's IP Address (e.g., 4, or 16 octets).
Where:
BGP next-hop: IPv6 address of egress PE.

In one embodiment, SRv6-VPN TLV is advertised along with the route. In one embodiment, SRv6-VPN TLV is not advertised along with the route. The processing of that route has not changed; it remains as described in RFC 7432.

IP Prefix Router (Type-5) with SRv6 Core

In one embodiment, EVPN route Type-5 is used to advertise IP address reachability through MP-BGP to all other PEs in a given EVPN instance. The IP address may include host IP prefix or any specific subnet. EVPN route Type-5 is defined in ietf-bess-evpn-prefix-advertisement-05. In one embodiment, the encoding is as follows:
Route Distinguisher (RD) (e.g., eight octets),
Ethernet Segment Identifier (e.g., ten octets),
Ethernet Tag ID (e.g., eight octets),
IP Prefix Length (e.g., one octet),
IP Prefix (e.g., six octets),
GW Address (e.g., four or sixteen octets), and
MPLS Label (e.g., three octets),
where:
BGP next-hop: IPv6 address of an egress PE, and
MPLS Label: Implicit-null.

In one embodiment, SRv6-VPN SID TLV is (or may be) advertised. The behavior of the SRv6-VPN SID is entirely up to the originator of the advertisement. In one embodiment, the behavior of the SRv6 SID is an End.DT6/4 or End.DX6/4.

Multicast Related Routes (EVPN Route Type-6, Type-7, Type-8)

In one embodiment, these routes do not require any additional SRv6-VPN TLV. In one embodiment, as per EVPN route-type 4, the BGP nexthop is equal to the IPv6 address of egress PE.

SRv6 END Functions Associated with a Local SID

The following describes end functions performed by an egress router in response to receiving a SRv6 packet including an advertised SID. The end function is typically determined by the function portion of the SID.

End.DX2: Endpoint with Decapsulation and Layer-2 Cross-Connect

One embodiment uses the "Endpoint with decapsulation and Layer-2 cross-connect to OIF" function (End.DX2 for short).

When N receives a packet destined to S and S is a local End.DX2 SID, N does:

```
IF NH=SRH and SL > 0
    drop the packet                      ;; Ref1
ELSE IF ENH = 59                         ;; Ref2
    pop the (outer)IPv6 header and its extension headers
    forward the resulting frame via OIF associated to the local SID
ELSE
    drop the packet
```

Ref1: An End.DX2 SID must always be the last SID, or it can be the Destination Address of an IPv6 packet with no SRH header.
Ref2: The next-header value 59 is allocated to IPv6 No Next Header per RFC 2460. When the SID is of function End.DX2 and the Next-Header is 59, an Ethernet frame is in the payload without any further header.

In one embodiment, an End.DX2 function is customized to expect a specific VLAN format and rewrite the egress VLAN header before forwarding on the outgoing interface. In one embodiment, the End.DX2 is used for L2VPN point-to-point use-cases.

End.DXV2: Endpoint with Decapsulation and Specific VLAN L2 Table Lookup

One embodiment uses the "Endpoint with decapsulation and specific VLAN L2 table lookup" function (End.DXV2 for short).

When N receives a packet destined to S and S is a local End.DXV2 SID, N does:

```
IF NH=SRH and SL > 0
    drop the packet                      ;; Ref1
ELSE IF ENH = 59                         ;; Ref2
    pop the (outer)IPv6 header and its extension headers
    lookup the exposed inner VLANs in L2 table T
    forward via the matched table entry
ELSE
    drop the packet
```

Ref1: An End.DXV2 SID must always be the last SID, or it can be the Destination Address of an IPv6 packet with no SRH header.
Ref2: The next-header value 59 is allocated to IPv6 No Next Header per RFC 2460. When the SID is of function End.DXV2 and the Next-Header is 59, an Ethernet frame is in the payload without any further header.

In one embodiment, an End.DXV2 function is customized to expect a specific VLAN format and rewrite the egress VLAN header before forwarding on the outgoing interface. In one embodiment, the End.DXV2 is used for EVPN Flexible cross-connect use-cases. The table lookup support dot1q, dot1ad with single and double tags.

End.DT2U: Endpoint with Decapsulation and Specific Unicast MAC L2 Table Lookup

One embodiment uses the "Endpoint with decapsulation and specific unicast MAC L2 table lookup" function (End.DT2U for short).

When N receives a packet destined to S and S is a local End.DT2U SID, N does:

```
IF NH=SRH and SL > 0
    drop the packet                 ;; Ref1
ELSE IF ENH = 59                    ;; Ref2
    pop the (outer)IPv6 header and its extension headers
    learn he exposed inner MAC SA in L2 table T ;; Ref3
    lookup the exposed inner MAC DA in L2 table T
    forward via the matched table entry
ELSE
    drop the packet
```

Ref1: An End. DT2U SID must always be the last SID, or it can be the Destination Address of an IPv6 packet with no SRH header.

Ref2: The next-header value 59 is allocated to IPv6 No Next Header per RFC 2460. When the SID is of function End. DT2U and the Next-Header is 59, an Ethernet frame is in the payload without any further header.

Ref3: In EVPN, the learning of the exposed inner MAC SA is done via control plane.

In one embodiment, the End.DT2U is used for EVPN Bridging unicast use cases.

End.DT2M: Endpoint with Decapsulation and Specific L2 Table Flooding

One embodiment uses the "Endpoint with decapsulation and specific L2 table flooding" function (End.DT2M for short).

When N receives a packet destined to S and S is a local End.DT2M SID, N does:

```
IF NH=SRH and SL > 0
    drop the packet                 ;; Ref1
ELSE IF ENH = 59                    ;; Ref2
    pop the (outer)IPv6 header and its extension headers
    learn the exposed inner MAC SA in L2 table T ;; Ref3
    forward based on all OIF in L2 table T
ELSE
    drop the packet
```

Ref1: An End. DT2M SID must always be the last SID, or it can be the Destination Address of an IPv6 packet with no SRH header.

Ref2: The next-header value 59 is allocated to IPv6 No Next Header per RFC 2460. When the SID is of function End. DT2U and the Next-Header is 59, an Ethernet frame is in the payload without any further header.

Ref3: In EVPN, the learning of the exposed inner MAC SA is done via control plane.

The End.DT2M is used for EVPN Bridging BUM use cases.

Arg.FE2: L2 Argument Specific to EVPN ESI Filtering

One embodiment uses the "L2 argument specific to EVPN ESI filtering" (Arg.FE2 for short) which is an argument of End.DT2M endpoint function. The Arg.FE2 argument is used to exclude a specific OIF from L2 table T flooding. The Arg.FE2 SID is merged with an End.DT2M function by bit ORing operation to form an End.DT2M(FE2) single SID. In one embodiment, the End.DT2M is used for EVPN Bridging with ESI filtering use cases.

End.DT2M(FE2): Endpoint with Decapsulation and Specific L2 table Flooding with Argument One embodiment uses the "Endpoint with decapsulation and specific L2 table flooding with argument" function (End.DT2M(FE2) for short).

When N receives a packet destined to S and S is a local End.DT2M SID, N does:

```
IF NH=SRH and SL > 0
    drop the packet                 ;; Ref1
ELSE IF ENH = 59                    ;; Ref2
    pop the (outer)IPv6 header and its extension headers
    learn the exposed inner MAC SA in L2 table T ;; Ref3
    forward based on all OIF excluding the one specified by
        ARGUMENT in L2 table T
ELSE
    drop the packet
```

Ref1: An End. DT2M SID must always be the last SID, or it can be the Destination Address of an IPv6 packet with no SRH header.

Ref2: The next-header value 59 is allocated to IPv6 No Next Header per RFC 2460. When the SID is of function End. DT2U and the Next-Header is 59, an Ethernet frame is in the payload without any further header.

Ref3: In EVPN, the learning of the exposed inner MAC SA is done via control plane.

The End.DT2M(FE2) is used for EVPN Bridging with ESI filtering use cases.

End.DX6: Endpoint with Decapsulation and IPv6 Cross-Connect

One embodiment uses the "Endpoint with decapsulation and cross-connect to an array of IPv6 adjacencies" function (End.DX6 for short).

When N receives a packet destined to S and S is a local End.DX6 SID, N does:

```
IF NH=SRH and SL > 0
    drop the packet                 ;; Ref1
ELSE IF ENH = 41                    ;; Ref2
    pop the (outer)IPv6 header and its extension headers
    forward to layer-3 adjacency bound to the SID S ;; Ref3
ELSE
    drop the packet
```

Ref1: An End. DX6 SID must always be the last SID, or it can be the Destination Address of an IPv6 packet with no SRH header.

Ref2: 41 refers to IPv6 encapsulation as defined by IANA allocation for Internet Protocol Numbers.

Ref3: Selected based on a hash of the packet's header (at least SA, DA, Flow Label in one embodiment).

One of the applications of the End.DX6 function of one embodiment is the L3VPN use-case where a FIB lookup in a specific tenant table at the egress PE is not required.

End.DX4: Endpoint with Decapsulation and IPv4 Cross-Connect

One embodiment uses the "Endpoint with decapsulation and cross-connect to an array of IPv4 adjacencies" function (End.DX4 for short).

When N receives a packet destined to S and S is a local End.DX4 SID, N does:

```
IF NH=SRH and SL > 0
    drop the packet                    ;; Ref1
ELSE IF ENH = 4                        ;; Ref2
    pop the (outer)IPv6 header and its extension headers
    forward to layer-3 adjacency bound to the SID S ;; Ref3
ELSE
    drop the packet
```

Ref1: An End. DX4 SID must always be the last SID, or it can be the Destination Address of an IPv6 packet with no SRH header.

Ref2: 4 refers to IPv4 encapsulation as defined by IANA allocation for Internet Protocol Numbers.

Ref3: Selected based on a hash of the packet's header (at least SA, DA, Flow Label in one embodiment).

One of the applications of the End.DX4 function of one embodiment is the L3VPN use-case where a FIB lookup in a specific tenant table at the egress PE is not required.

End.DT6: Endpoint with Decapsulation and Specific IPv6 Table Lookup

One embodiment uses the "Endpoint with decapsulation and specific IPv6 table lookup" function (End.DT6 for short).

When N receives a packet destined to S and S is a local End.DT6 SID, N does:

```
IF NH=SRH and SL > 0
    drop the packet                    ;; Ref1
ELSE IF ENH = 41                       ;; Ref2
    pop the (outer)IPv6 header and its extension headers
    lookup the exposed inner IPv6 DA in IPv6 table T
    forward via the matched table entry
ELSE
    drop the packet
```

Ref1: An End. DT6 SID must always be the last SID, or it can be the Destination Address of an IPv6 packet with no SRH header.

Ref2: 41 refers to IPv6 encapsulation as defined by IANA allocation for Internet Protocol Numbers.

One of the applications of the End.DT6 function of one embodiment is the L3VPN use-case where a FIB lookup in a specific tenant table at the egress PE is required. Note that an End.DT6 may be defined for the main IPv6 table in which case and End.DT6 supports the equivalent of an IPv6inIPv6 decaps (without VPN/tenant implication).

End.DT4: Endpoint with Decapsulation and Specific IPv4 Table Lookup

One embodiment uses the "Endpoint with decapsulation and specific IPv4 table lookup" function (End.DT4 for short).

When N receives a packet destined to S and S is a local End.DT4 SID, N does:

```
IF NH=SRH and SL > 0
    drop the packet                    ;; Ref1
ELSE IF ENH = 4                        ;; Ref2
    pop the (outer)IPv6 header and its extension headers
    lookup the exposed inner IPv4 DA in IPv4 table T
    forward via the matched table entry
ELSE
    drop the packet
```

Ref1: An End. DT4 SID must always be the last SID, or it can be the Destination Address of an IPv6 packet with no SRH header.

Ref2: 4 refers to IPv4 encapsulation as defined by IANA allocation for Internet Protocol Numbers.

One of the applications of the End.DT4 function of one embodiment is the L3VPN use-case where a FIB lookup in a specific tenant table at the egress PE is required. Note that an End.DT4 may be defined for the main IPv4 table in which case and End.DT4 supports the equivalent of an IPv4inIPv6 decaps (without VPN/tenant implication).

T.Encaps.L2: Transit with Encapsulation of L2 Frames

In one embodiment, T.Encaps.L2 encapsulates the received L2 frame (i.e. the received Ethernet header and its optional VLAN header is in the payload of the outer packet). If the outer header is pushed without SRH then the DA must be a SID of type End.DX2, End.DXV2, End.DT2U or End.DT2M and the next-header must be 59 (IPv6 NoNext-Header). The received Ethernet frame follows the IPv6 header and its extension headers. Else, if the outer header is pushed with a SRH, then the last SID of the SRH must be of type End.DX2, End.DXV2, End.DT2U or End.DT2M and the next-header of the SRH must be 59 (IPv6 NoNext-Header). The received Ethernet frame follows the IPv6 header and its extension headers.

In one embodiment, T.Encaps.L2 encapsulates the received L2 frame as follows.

```
IF outer header is pushed without SRH
    IPv6 DA must be a SID of type Layer-2 ;; Ref2
    IPv6 Next-header equals 59 (IPv6 NoNextHeader)
    received L2 frame follows IPv6 header
ELSE (i.e. outer header is pushed with IPv6+SRH)
    The 0th SID of the SRH must be a SID of type Layer-2 ;; Ref2
    SRH Next-Header equals 59 (IPv6 NoNextHeader)
    received L2 frame follows IPv6 header and its extension headers
```

Ref1: received L2 frame=received Ethernet header and its optional VLAN header.

Ref2: 4 Layer-2=End.DX2, End.DX2V, End.DT2U or End.DT2M.

Error Handling of BGP SRv6 SID Updates

In one embodiment, when a BGP Speaker receives a BGP Update message containing a malformed SRv6-VPN SID TLV, it ignores the received BGP attributes and does not pass it to other BGP peers. This is equivalent to the -attribute discard- action specified in RFC 7606. In one embodiment, when discarding an attribute, a BGP speaker logs or does not log an error for further analysis.

CONCLUDING PARAGRAPHS

In summary, in one embodiment, Ethernet Virtual Private Network (EVPN) is implemented using Internet Protocol Version 6 (IPv6) Segment Routing (SRv6) underlay network and SRv6-enhanced Border Gateway Protocol (BGP) signaling. A particular route associated with a particular Internet Protocol Version 6 (IPv6) Segment Routing (SRv6) Segment Identifier (SID) is advertised in a particular route advertisement message of a routing protocol (e.g., BGP). The SID includes a locator of a particular router and a function encoding representing a particular EVPN end function of the particular router, with the particular SID including a routable prefix to the particular router. The particular router receives a particular packet including the particular SID; and in response, the particular router performs the particular EVPN end function on the particular packet. In one embodiment, the particular packet includes a Segment Routing Header (SRH) including the particular SID as the currently active SID.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
updating forwarding information at a particular router in a network, the forwarding information being updated based on a received route advertisement message, wherein the received route advertisement message identifies a route associated with an Internet Protocol Version 6 (IPv6) segment routing (SRv6) segment identifier (SID), wherein the SRv6 SID encodes a function that identifies particular processing to be performed on a received IPv6 packet and an Ethernet Segment Identifier (ESI), and wherein the SRv6 SID comprises a routable address of the particular router; and
based on a determination that an Internet Protocol (IP) destination address of the received IPv6 packet is the SRv6 SID, performing, by the particular router, the function encoded in the SRv6 SID.

2. The method of claim 1, wherein performing the function encoded in the SRv6 SID comprises:
decapsulating a particular Ethernet frame from the received IPv6 packet; and
forwarding the particular Ethernet frame from each of a subset of a plurality of output interfaces identified in a corresponding table associated with the forwarding information.

3. The method of claim 2, wherein the subset of the plurality of output interfaces comprises a portion of the plurality of output interfaces excluding one or more of the plurality of output interfaces associated with the ESI.

4. The method of claim 1, wherein the function comprises a particular Ethernet Virtual Private Network (EVPN) Layer 2 (L2) flooding segment routing end function.

5. The method of claim 1, wherein the received route advertisement message advertises a border gateway protocol (BGP) route type 1, 2, 3, or 5, and is associated with a particular SRv6 virtual private network (VPN) Type Length Value (TLV) including the SRv6 SID.

6. The method of claim 1, wherein the received IPv6 Packet includes a segment routing header (SRH) including the SRv6 SID as a currently active SID.

7. The method of claim 1, wherein the particular router and an additional router in the network are multihomed to a network node, the method further comprising:
decapsulating, by the additional router, a particular Ethernet frame from an additional IPv6 packet received; and
forwarding the particular Ethernet frame from each of a plurality of router output interfaces identified in a corresponding table of the additional router.

8. The method of claim 1, wherein performing the function comprises determining not to forward a particular Ethernet frame of the received IPv6 Packet from one or more output interfaces identified as associated with the ESI.

9. A system comprising:
one or more processors; and
at least one non-transitory computer-readable medium containing instructions which, when executed by the one or more processors, cause the one or more processors to:
update forwarding information at the system, the forwarding information being updated based on a received route advertisement message, wherein the received route advertisement message identifies a route associated with an Internet Protocol Version 6 (IPv6) segment routing (SRv6) segment identifier (SID), wherein the SRv6 SID encodes a function that identifies particular processing to be performed on a received IPv6 packet and an Ethernet Segment Identifier (ESI), and wherein the SRv6 SID comprises a routable address of the system; and
based on a determination that an Internet Protocol (IP) destination address of the received IPv6 packet is the SRv6 SID, perform the function encoded in the SRv6 SID.

10. The system of claim 9, wherein performing the function encoded in the SRv6 SID comprises:
decapsulating a particular Ethernet frame from the received IPv6 packet; and
forwarding the particular Ethernet frame from each of a subset of a plurality of output interfaces identified in a corresponding table associated with the forwarding information.

11. The system of claim 10, wherein the subset of the plurality of output interfaces comprises a portion of the plurality of output interfaces excluding one or more of the plurality of output interfaces associated with the ESI.

12. The system of claim 9, wherein the function comprises a particular Ethernet Virtual Private Network (EVPN) Layer 2 (L2) flooding segment routing end function.

13. The system of claim 9, wherein the received route advertisement message advertises a border gateway protocol (BGP) route type 1, 2, 3, or 5, and is associated with a particular SRv6 virtual private network (VPN) Type Length Value (TLV) including the SRv6 SID.

14. The system of claim 9, wherein the received IPv6 Packet includes a segment routing header (SRH) including the SRv6 SID as a currently active SID.

15. The system of claim 9, wherein the system and a particular router in a network are multihomed to a network node, wherein the additional router is configured to decapsulate a particular Ethernet frame from an additional IPv6 packet received, and forward the particular Ethernet frame from each of a plurality of router output interfaces identified in a corresponding table of the particular router.

16. The system of claim 9, wherein performing the function comprises determining not to forward a particular Ethernet frame of the received IPv6 Packet from one or more output interfaces identified as associated with the ESI.

17. At least one non-transitory computer-readable medium having stored thereon instructions which, when executed by one or more processors, cause the one or more processors to:
update forwarding information at a particular router in a network, the forwarding information being updated based on a received route advertisement message, wherein the received route advertisement message identifies a route associated with an Internet Protocol Version 6 (IPv6) segment routing (SRv6) segment identifier (SID), wherein the SRv6 SID encodes a function that identifies particular processing to be performed on a received IPv6 packet and an Ethernet Segment Identifier (ESI), and wherein the SRv6 SID comprises a routable address of the particular router; and based on a determination that an Internet Protocol (IP) destination address of the received IPv6 packet is the SRv6 SID, perform the function encoded in the SRv6 SID.

18. The at least one non-transitory computer-readable medium of claim 17, wherein performing the function encoded in the SRv6 SID comprises:

decapsulating a particular Ethernet frame from the received IPv6 packet; and forwarding the particular Ethernet frame from each of a subset of a plurality of output interfaces identified in a corresponding table associated with the forwarding information.

19. The at least one non-transitory computer-readable medium of claim 18, wherein the subset of the plurality of output interfaces comprises a portion of the plurality of output interfaces excluding one or more of the plurality of output interfaces associated with the ESI.

20. The at least one non-transitory computer-readable medium of claim 17, wherein the function comprises a particular Ethernet Virtual Private Network (EVPN) Layer 2 (L2) flooding segment routing end function.

* * * * *